United States Patent
Vanderheyden et al.

(10) Patent No.: US 6,568,618 B1
(45) Date of Patent: May 27, 2003

(54) HALF-INCH TAPE DRIVE IN HALF HIGH FORM FACTOR

(75) Inventors: William J. Vanderheyden, Loveland; Kevin S. Fletcher; Michael J. O'Keeffe, both of Boulder; David B. Daniel, Longmont, all of CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/575,977

(22) Filed: May 23, 2000

(51) Int. Cl.[7] .............................................. G11B 15/66
(52) U.S. Cl. ................. 242/332.7; 242/332.8; 360/93
(58) Field of Search .......................... 242/332.4, 332.7, 242/332.8, 614, 348.2; 360/132, 93, 95

(56) References Cited

U.S. PATENT DOCUMENTS

| | | | |
|---|---|---|---|
| 3,987,975 A | * 10/1976 | Jackson | 242/71.8 |
| 4,327,879 A | * 5/1982 | Tanny | 242/71.8 |
| 4,647,994 A | * 3/1987 | Irwin et al. | 360/85 |
| 5,204,792 A | * 4/1993 | Bryer | 360/96.5 |
| 5,282,105 A | * 1/1994 | Eaton et al. | 360/130.21 |
| 5,443,220 A | * 8/1995 | Hoge et al. | 242/332.8 |
| RE35,606 E | * 9/1997 | Perona | 360/93 |
| 5,751,514 A | * 5/1998 | Hyde et al. | 360/97.01 |
| 6,152,350 A | * 11/2000 | Hayashi et al. | 228/102 |

* cited by examiner

Primary Examiner—Donald P. Walsh
Assistant Examiner—Joseph C Rodriguez
(74) Attorney, Agent, or Firm—Patton Boggs LLP (57) ABSTRACT

The half-inch tape drive comprises a novel takeup reel, tape deck, PC board packaging, loading mechanism, and housing. The takeup reel comprises a pair of segmented flanges that define a first and second tape containment section. The tape deck is approximately half the height of a conventional tape deck and includes reinforcing ribs to provide structural rigidity and maintain alignment of the moving components of the tape drive during operation. The loading mechanism comprises a horizontally mounted load motor that employs a worm gear to engage a simplified gear train. The printed circuit board is segmented into multiple sections that are mounted in various locations on the tape drive to maximize spatial efficiencies and reduce the overall height of the tape drive. The tape drive housing provides a protective exterior for the tape drive components and provides the structure for mounting the present tape drive in a single drive bay of a computer housing.

19 Claims, 8 Drawing Sheets

HALF-INCH TAPE DRIVE IN HALF HIGH FORM FACTOR

FIELD OF THE INVENTION

The invention relates to digital tape drive storage devices, and in particular, to a half-inch tape drive having a half high form factor.

PROBLEM

Tape drives have been widely employed in industry for over thirty years due to their ability to store large amounts of data on a relatively small inexpensive removable format. The data is stored on tape drives utilizing a variety of designs, but in all cases, magnetic tape media is wound between a pair of tape reels as data is transferred to or from the tape media. The standard tape media employed in many applications is a one half-inch wide tape media housed in a tape cartridge measuring at or near 1 inch in height. Presently, all tape drives that utilize half-inch tape media are constructed in a full height five and a quarter (5.25) inch or larger form factor as defined by: EIA specification No. 3877-A "Small Form Factor 133.35 mm (5.25) Disk Drives." One example of a full height five and a quarter (5.25) form factor for tape drives includes a width dimension "W" of 5.75 inches a depth dimension "D" of 8.1 inches and a height dimension "H" of 3.2 inches. Therefore, half-inch tape drives occupy two drive bays when installed in a conventional computer housing.

In the art of data storage, the physical space required to store data is an important concern. Thus, it is desirable to have a half-inch tape drive that is constructed with a half height form factor that can be installed in a single drive bay in a conventional computer housing. The half height form factor, also defined in EIA specification No. 3877-A "Small Form Factor 133.35 mm (5.25) Disk Drives" includes a maximum height of 1.634 inches. Unfortunately, in addition to the fact that half-inch tape cartridges are approximately 1 inch by themselves, several other design requirements make achieving a half-height form factor in a half-inch tape drive extremely difficult.

Figure 1:
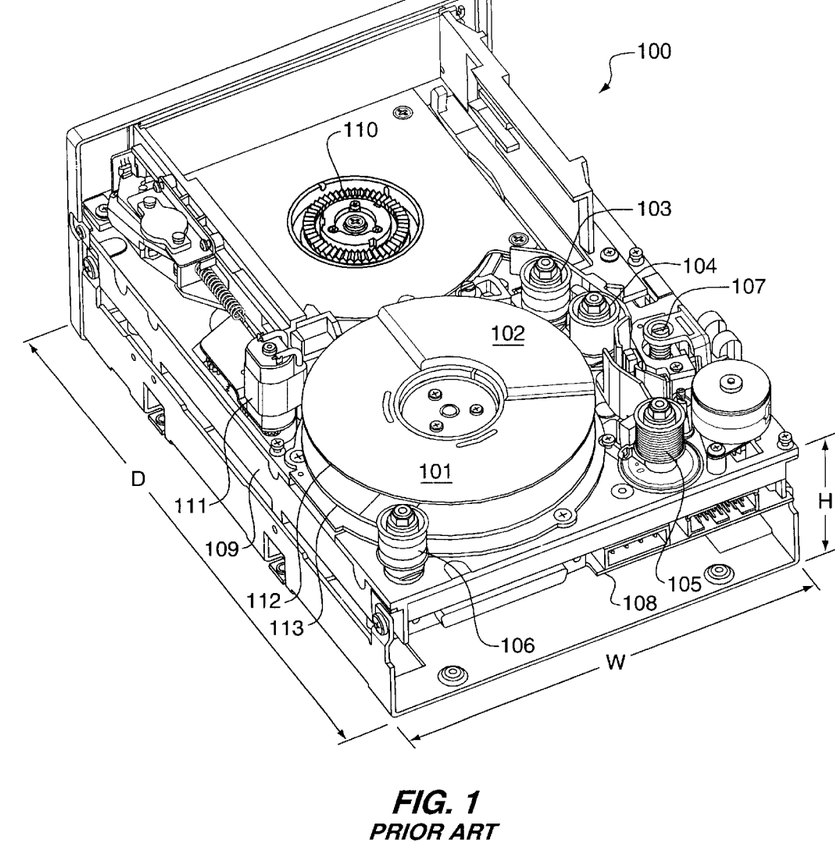
FIG. 1 illustrates an example of a prior art half-inch tape drive.
Figure 2:
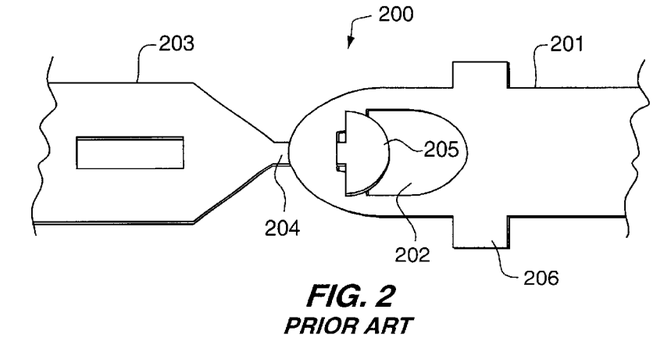
FIG. 2 illustrates an example a buckle connection between a tape cartridge leader and a takeup leader.

FIG. 1 illustrates one example of a typical half-inch tape drive 100. The tape drive 100 is a DLT tape drive that employs a single reel DLT tape cartridge design. This design includes a supply reel located within a tape cartridge (not shown) and a takeup reel 101 located within the tape drive 100. Referring to FIG. 2, the tape media on the tape cartridge is terminated at one end by a tape cartridge leader 201. The tape cartridge leader 201 is a strong flexible plastic strip containing an ovular aperture 202 on its distal end. A takeup leader 203, that connects to the takeup reel 101, is a similar plastic strip that includes a stem 204 and tab 205 designed to buckle with the ovular aperture 202 on the tape cartridge leader 201 to form buckle 200. The tape cartridge leader 201 also includes a section 206 that is slightly wider than the rest of the tape cartridge leader 201 and the takeup leader 203. The wider section 206 prevents the tape cartridge leader 201 from being pulled into the tape cartridge after the tape cartridge leader 201 and takeup leader 203 are disconnected for ejection of the tape cartridge.

Upon loading the tape cartridge into the tape drive 100, the takeup leader 203 and tape cartridge leader 201 are buckled, and the tape media is wound to a start point or read position. To accommodate the slightly wider section 206 during winding of the tape cartridge leader 201 and the takeup leader 203 around the takeup reel 101, the takeup reel 101 includes a wider stepped area 102 formed in the top and in the bottom flanges, 112 and 113, of the takeup reel 101. Unfortunately, the stepped area 102 adds approximately a quarter of an inch to the height of the takeup reel 101 and the overall height of the tape drive 100.

Another design requirement in half-inch tape drives is the physical size of the tape deck 109. The tape deck 109 functions as a supporting surface for the various mechanical and electrical components, such as the takeup reel 101, tape guides 103–106, the read/write head 107 and the printed circuit board ("PC") 108 mounted on the underside of the tape deck 109. To maintain an accurate alignment of the takeup reel 101, tape guides 103–106 and the read/write head 107, during operation of the tape drive 100 requires a rigid tape deck 109. To achieve the necessary rigidity in the tape deck 109, typical DLT tape drive decks are approximately one (1) inch in height. Additionally, the PC board 108 is mounted on the underside of the tape deck 109 further adding to the overall height of the tape deck 109 and the tape drive 100.

Finally, another design requirement in half-inch tape drives is the loading mechanism that engages the tape cartridge drive mechanism 110 through a toothed coupling. The loading mechanism comprises a vertically mounted load motor 111 coupled to a spur gear train (not shown) that engages the cartridge drive mechanism 110. Unfortunately, the load motor 111 is mounted vertically in order to engage the gear train and move the cartridge drive mechanism 110 vertically up and down to engage and disengage the tape cartridge reel when a tape cartridge is inserted into the tape drive 100. The vertically mounted load motor 111 again adds to the overall height of the tape drive 100.

SOLUTION

The present invention overcomes the problems outlined above and advances the art by providing a half-inch tape drive that is implemented in a half height form factor. A first advantage of the present half-inch tape drive is that it accommodates conventional half-inch tape cartridges. It can be appreciated that not modifying the tape cartridge format represents a significant advantage to consumers whose data is currently stored on half-inch tape cartridges. A second advantage of the present half-inch tape drive is that the half height form factor permits installation of this tape drive in a single drive bay in a conventional computer housing. A third advantage of the present half-inch tape drive is improved manufacturability resulting from the reduction in material and design improvements. Additionally, one skilled in the art will appreciate numerous other advantages of the half-height form factor, such as doubling the storage capacity in a single computer by the accommodation of twice as many tape drives and the additional flexibility added to data storage design.

The present half-inch tape drive comprises a novel takeup reel, tape deck, PC board packaging, loading mechanism, and housing. The takeup reel comprises a takeup reel hub connected between a pair of segmented flanges that define first and second tape containment sections. The tape deck is approximately half the height of a conventional tape deck and includes reinforcing ribs that provide structural rigidity to maintain alignment of the moving components of the tape drive during operation. The tape deck also includes a plurality of guiding ribs that cooperate with the takeup reel to vertically align the tape media in the tape path during power interruptions. The loading mechanism comprises a horizontally mounted load motor that connects to a simplified gear train. A worm gear provides the connection between the load motor and the gear train and permits the horizontal mounting of the load motor. The PC board packaging comprises a first PC board section mounted in a first location, a second PC board section mounted in a second location and a third PC board section mounted in a third location on the tape drive. The separate PC board sections and mounting locations maximize spatial efficiencies and reduce the overall height of the tape drive. The first, second, and third PC board sections are electrically connected by flex cables that further improve the spatial utilization in the tape drive. The tape drive housing provides a protective exterior for the present tape drive and provides the structure for mounting the present tape drive in a single drive bay of a computer housing.

DETAILED DESCRIPTION

Figure 3:
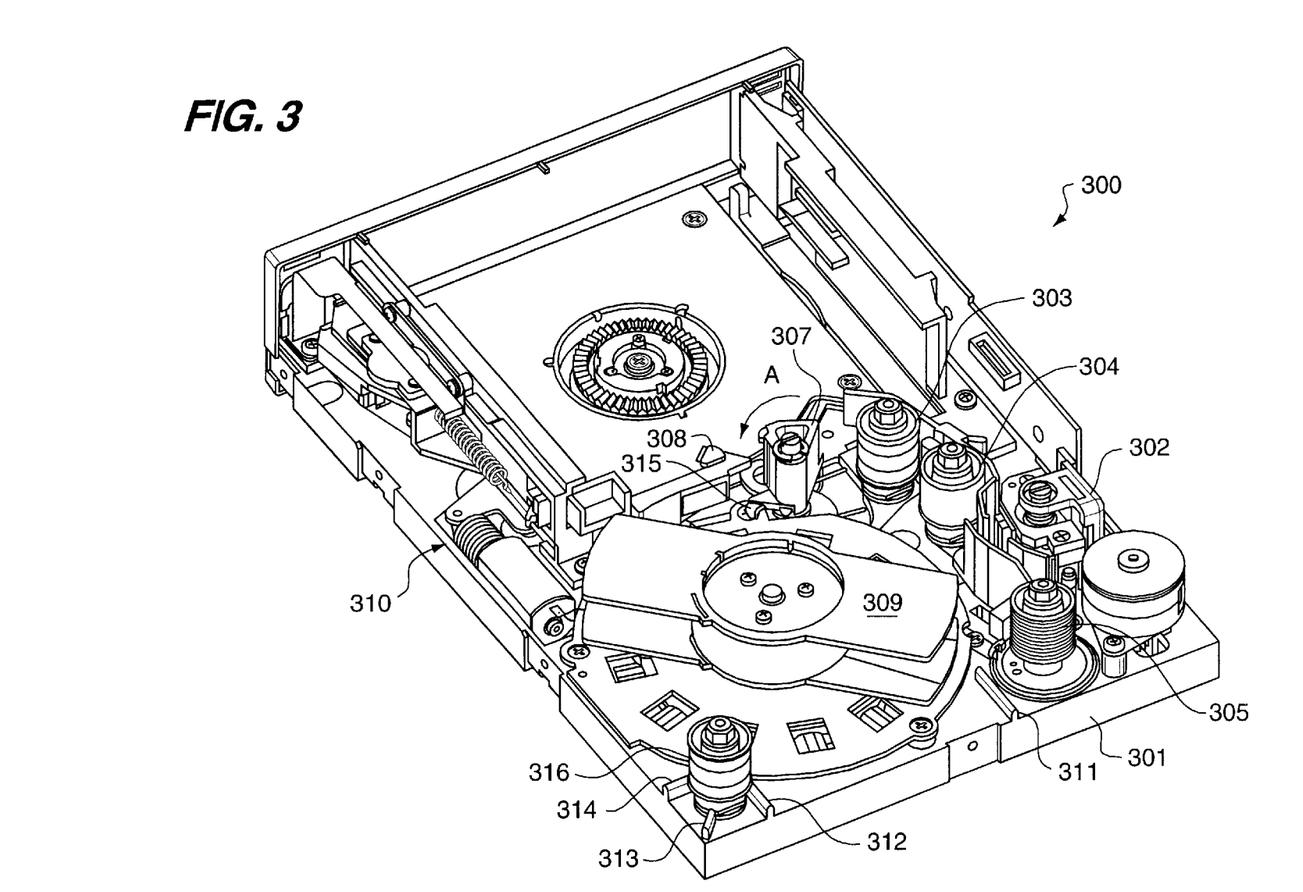
FIG. 3 illustrates an example of a half-inch tape drive having a half height form factor according to the present invention.

Half Height Form Factor FIG. 3

For purposes of illustration and not of limitation, various features and advantages of the present invention will now be described within the context of a single reel half-inch DLT tape drive. It is to be understood that the following description with respect to a DLT tape drive is not intended to limit the scope of the present invention. It would be obvious to one skilled in the art that the principles of the present invention could be easily applied to other tape drive formats to construct a tape drive with a half high form factor.

Figure 10A:
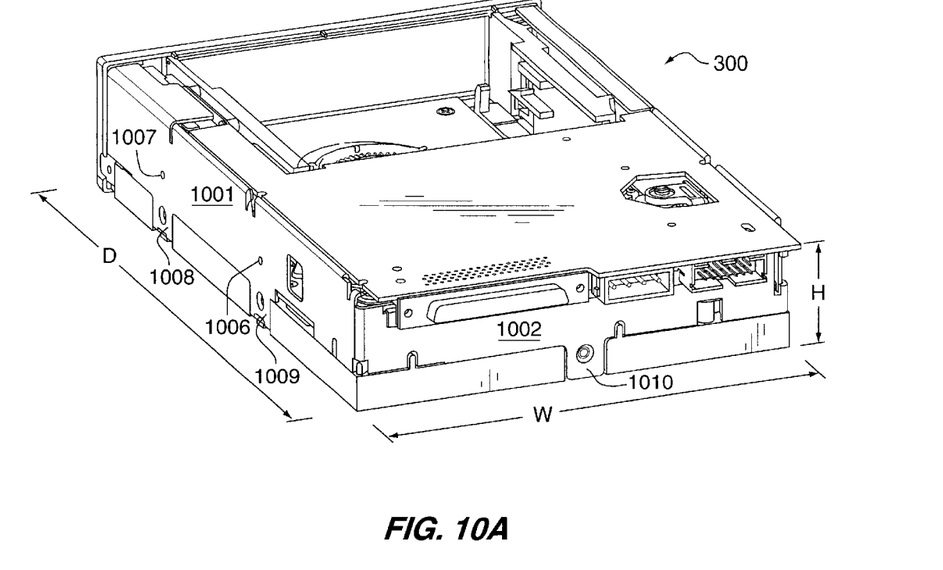
FIGS. 10A and 10B illustrate a housing for a half-inch tape drive having a half height form factor according to the present invention.

FIG. 3 depicts an example of a half-inch tape drive 300 having a half height form factor according to the present invention. Referring to FIG. 10a, illustrating an assembled half inch tape drive with a half height form factor, the half height form factor of the tape drive 300 complies with the EIA specifications for half height disk drives as given in EIA specification No. 3877-A "Small Form Factor 133.35 mm (5.25 in) Disk Drives." The half-inch tape drive 300 of the present invention includes a height "H" of 1.625 inches, a width "W" of 5.75 inches, a depth "D" of 8.1 inches, and fits into a single drive bay in a conventional computer. Referring back to FIG. 3, the tape drive 300 comprises various conventional components such as a tape head 302, tape guides 303–306, takeup leader catch 307 and positioning lever 308. However, to achieve the half-height form factor, the tape drive 300 also includes a novel takeup reel 309, tape deck 301, load mechanism 310, PC board packaging and connection (not shown on FIG. 3), and housing (also not shown on FIG. 3).

Figure 4:
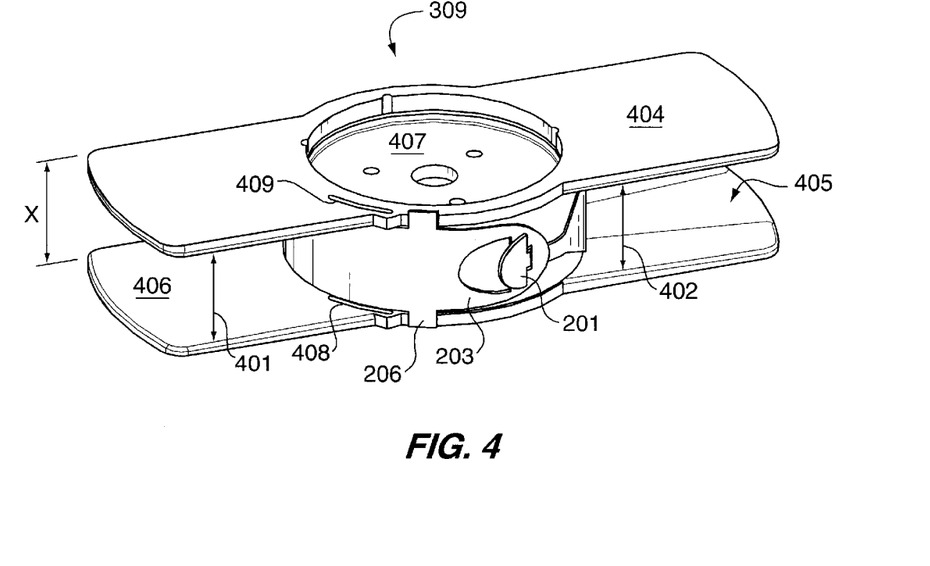
FIGS. 4 and 5 illustrate an example of a takeup reel for a half-inch tape drive having a half height form factor according to the present invention.
Figure 5:
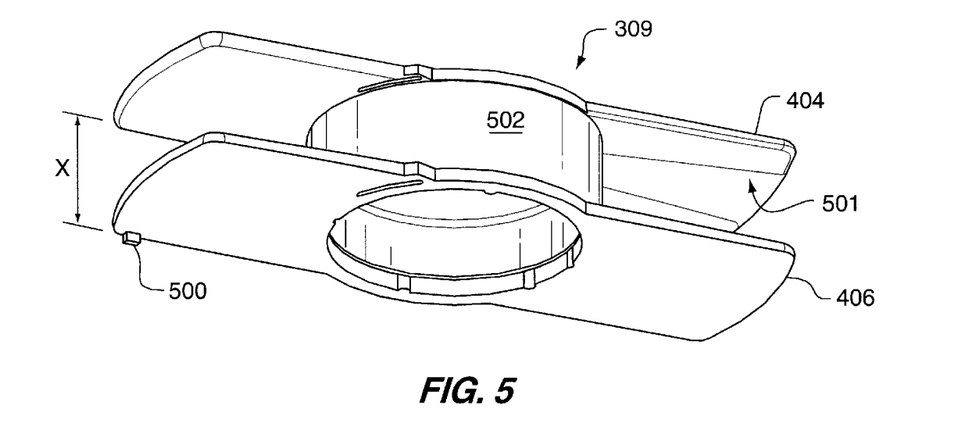

The Takeup Reel FIGS. 4 and 5

Referring to FIGS. 4 and 5, there is shown an example of a takeup reel 309 for the half-inch tape drive 300. The takeup reel 309 comprises a top segmented flange 404 connected to a top of a takeup reel hub 407 and a bottom segmented flange 406 connected to a bottom of the takeup reel hub 407. The takeup reel hub 407 could be a conventional takeup reel hub that connects to the tape drive 300 in a conventional manner. This configuration of the take up reel 309 includes a height dimension "X" of no greater than 0.641 inches.

The top and bottom flanges, 404 and 406, are connected in a parallel relationship and form a first tape media containment section 401 and a second tape media containment section 402 on opposing sides of the takeup reel hub 407. The first tape media containment section 401 and the second tape media containment section 402 guide the half-inch tape media around the takeup reel hub 407 during operation of the tape drive 300. During the initial winding of the tape cartridge leader 201 and the takeup leader 203, the wider section 206 of the tape cartridge leader 201, rests between the first tape containment section 401 and the second tape containment section 402 of the takeup reel 309. This allows the wider section 206 of the tape cartridge leader 201 to extend slightly above the top and below the bottom of the takeup reel 309 as illustrated by FIG. 4.

Advantageously, this design accommodates the additional height of the tape cartridge leader 201, while reducing the overall height of the tape drive 300 by eliminating the stepped area 102 of the prior art takeup reel 101. Also advantageously, eliminating the stepped area 102 permits the top flange 404 and bottom flange 406 of takeup reel 309 to be ultrasonically welded to the takeup reel hub 407. One skilled in the art will appreciate that this represents a significant advantage over the prior art takeup reel 101, which includes glued flanges, as the stepped area 102 prevents the cost effective application of the ultrasonic welding technique.

A first slot 409, in the top flange 404, and a second slot 408, in the bottom flange 406, provide for the attachment of the takeup leader 203. Alternatively, the takeup leader 203 could be attached to the takeup reel 309 in any suitable manner as a matter of design choice. Some examples include without limitation, a single vertical slot on the face 502 of the takeup reel hub 407 that is configured to receive the end of the takeup leader 203 or using a bonding agent to affix the takeup leader 203 to the face 502 of the takeup reel hub 407.

A first rounded protrusion 501 on the underside of the top flange 404 and a second rounded protrusion on the top surface of the bottom flange 406 reduce the spacing in the second tape containment section 402 in a localized area. The reduced spacing operates both to contain the tape media and align the tape media during winding and unwinding from the takeup reel 309. In alternative embodiments, the first rounded protrusion 501 and the second rounded protrusion 405 could be located on the first flange 404 and the second flange 406, but in the first tape containment section 401. Also alternatively, the rounded protrusions 501 and 405 could be included on the first flange 404 and the second flange 406 in both the first and the second tape containment sections 401 and 402. Advantageously, since highly precise tolerances must be maintained during formation of the rounded protrusions, 501 and 405, locating the critical spacing defined by protrusions, 501 and 405, in only one the tape containment sections, 401 or 402, improves the manufacturability of the takeup reel 309 resulting in lower manufacturing costs.

A small post 500 integrally formed on the underside of the bottom flange 406 provides a stop for the takeup reel 309 when a tape cartridge is unloaded from the tape drive 300. Referring back to FIG. 3, catch 307 includes a hook 315 that engages post 500 to prevent further rotation of the takeup reel 309 when catch 307 is rotated in direction "A" during unbuckling of the tape cartridge leader 201 and the takeup leader 203. The post 500 replaces the function previously performed by the stepped area 102 on the bottom flange 113 of the prior art takeup reel 101.

Still referring to FIG. 3, tape media supporting ribs 311–314 are integrally formed on the top portion of the tape deck 301. Supporting rib 311 is located between the tape guide 305 and the takeup reel 309 in a perpendicular relationship with the backside of the tape deck 301. The supporting ribs 312–314 are located around tape guide 306 as illustrate by FIG. 3. The supporting guides 311–314 are not required for proper operation of a tape drive according to the present invention, but are relevant to the present invention because they solve a known problem with both the prior art takeup reel 101 and the present takeup reel 309.

The supporting guides 311–314 support the tape media during power interruptions in the tape drive 300. During a power interruption where proper tension is not maintained on the tape media, the tape media can fall vertically off the guide rollers 303–306. In relation to the present takeup reel 309, the tape media could also fall vertically off of the takeup reel 309 between the first tape containment section 401 and the second tape containment section 402 due to the reduction in support provided by the segmented flanges 404 and 406. If the tape media is vertically out of position when the tape drive 300 is powered back on, the tape media could be damaged by either the bottom flange 406 or the tape guides 303–306 when the tape media is pulled back into position on the takeup reel 309 and tape guides 303–306. Advantageously, the supporting ribs 311–314 prevent the tape media from falling vertically out of position during power interruptions. It should be noted, however, that where proper tension is maintained on the tape media during power interruptions, the tape media will not fall vertically off of the takeup reel 309 or the tape guides 303–306.

Figure 6:
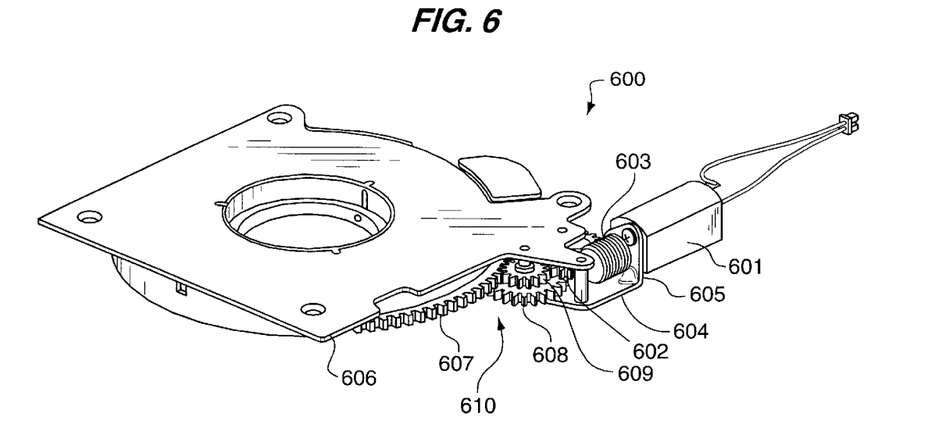
FIGS. 6 and 6a illustrate an example of a loading mechanism for a half-inch tape drive having a half height form factor according to the present invention.
Figure 6A:
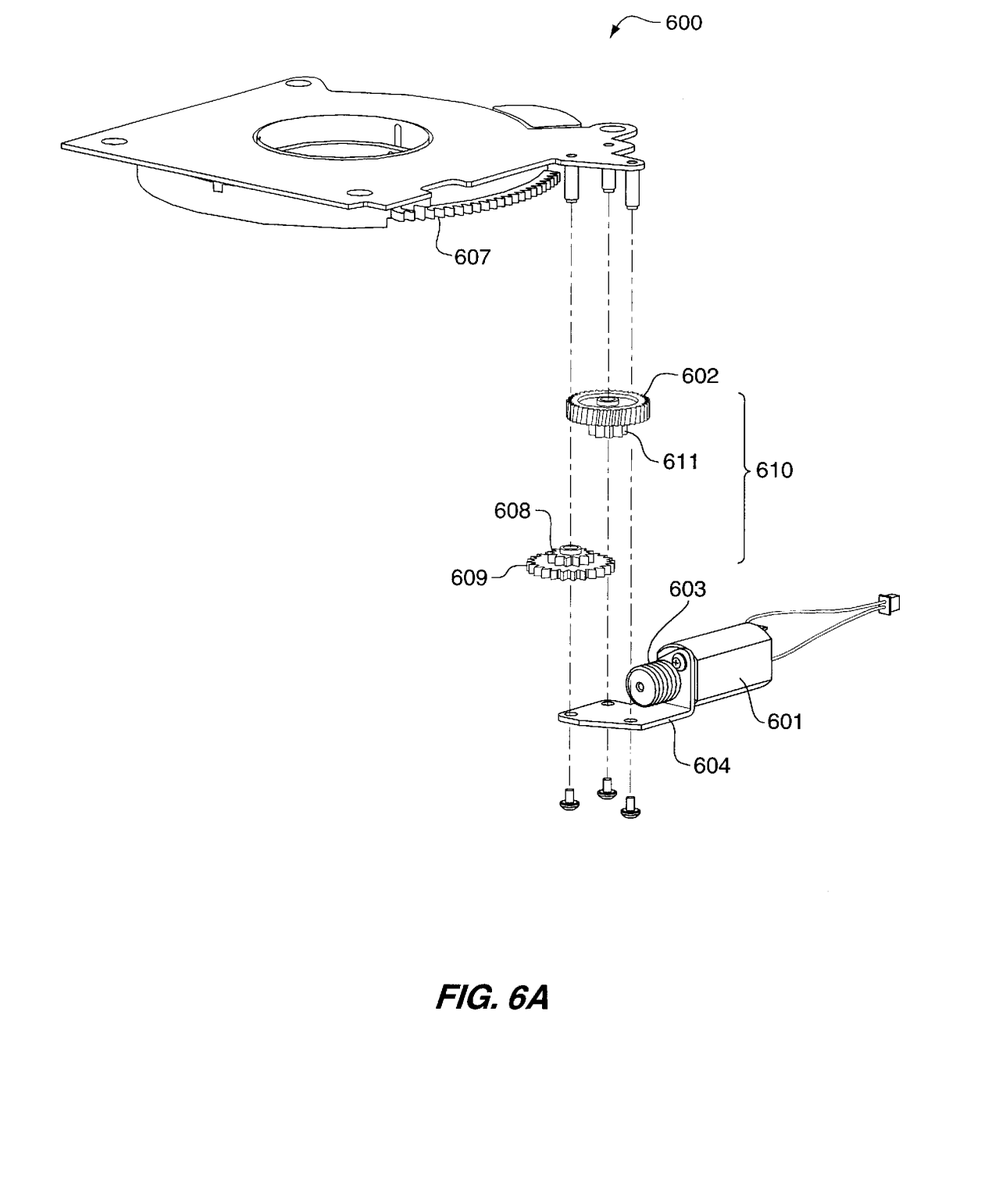
Figure 7:
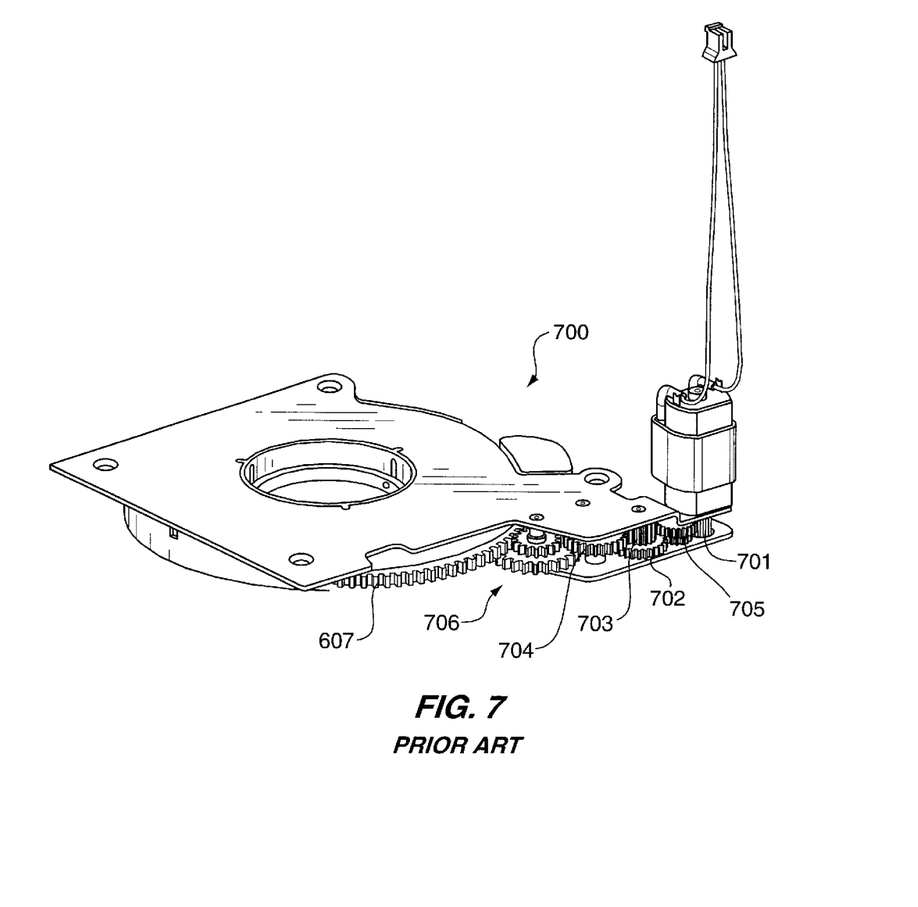
FIG. 7 illustrates a prior art loading mechanism for a prior art half-inch tape drive.

Loading Mechanism FIGS. 6a, 6b and 7

FIGS. 6a and 6b illustrate an example of a loading mechanism 600 for the half-inch tape drive 300 having a half height form factor. The loading mechanism 600 comprises a load motor 601 connected to a gear train 610 by a worm gear 603. The gear train 610 comprises a helical engagement gear 602 connected to a spur gear 611. The helical engagement gear 602 mates with the worm gear 603 to drive the spur gear 611. The spur gear 611 in turn drives a pair of intermediary spur gears, 608 and 609, which engage the main drive gear 607. The load motor 601 connects horizontally to a mounting bracket 604 that rivets to a top plate 606. Alternatively, the load motor 601 could be connected to the loading assembly 600 by any suitable manner that allows the warm gear 603 to mate with the engagement gear 602.

Referring to FIG. 7 depicting a prior art loading mechanism 700, it can be seen that the top plate 606 has been modified to permit the load motor 601 to be placed closer to the main drive gear 607. Advantageously, the worm gear 603 and helical engagement gear 602 provide an additional mechanical advantage over the prior art spur gear train allowing for a reduction in the number of gears required to operate the main drive gear 607. Specifically, spur gears 701–705 are eliminated from the prior art gear train 706 resulting in a quieter and simpler loading mechanism 600.

Figure 8:
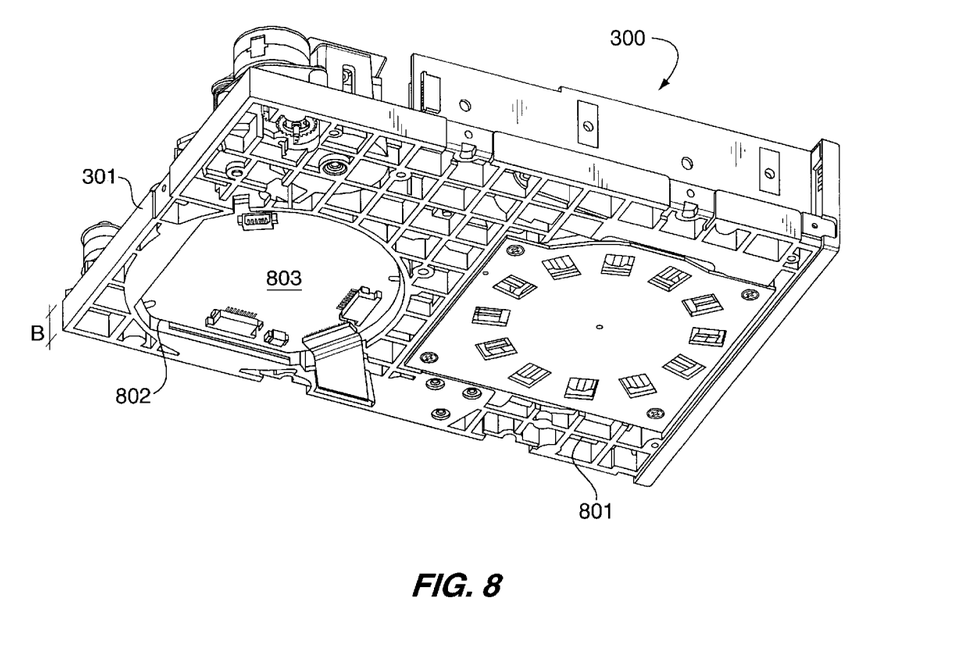
FIG. 8 illustrates a tape deck for a half-inch tape drive having a half height form factor according to the present invention.

Tape Deck FIG. 8

FIG. 8 illustrates an example of a tape deck 301 for the half-inch tape drive 300 having a half height form factor. The height "B" of the tape deck 301 is approximately half the height of the tape deck 109 of the prior art tape drive 100. In an exemplary example of the present invention, the height of the tape deck 301 is in the range of 0.4 to 0.5 inches and more preferably is 0.460 inches.

Tape drive decks are typically constructed from aluminum. Thus, to compensate for the loss in rigidity that would normally result from the reduced size of the tape deck 301, a of reinforcing ribs e.g. 801 are integrally formed in the bottom of the tape deck 301. Alternatively, other methods could be used to provide the necessary rigidity in the tape deck 301 as a matter of design choice. Some examples include without limitation, the use of a more rigid material in the construction of the tape deck 301 or the use of stiffening members, such as would be provided by a support beam across the bottom of the tape deck 301.

As will become apparent from the following description, the tape deck 301 also includes a circular recessed portion 802 that houses a section of the PC board 803. Advantageously, the reinforcing ribs 801 provide the necessary structural integrity to maintain accurate alignment of the moving components of the tape drive 300, such as the takeup reel 309, tape guides 303–306, tape head 302 and various drive and load motors. Additional features of the tape deck 301 will become apparent from the following description of the PC board packaging.

Printed Circuit Board FIGS. 9a, 9b, 10a, 10b

FIGS. 9A, 9B, 10A and 10B illustrate an example of a PC board for the half-inch tape drive 300 having a half height form factor. The size of the prior art PC board 108 required that it either be located on the top of the prior art tape drive 100 or on the underside of the tape deck 109, as shown in FIG. 1. To achieve more efficient space utilization, the PC board of the present half-inch tape drive 300 is separated into three segmented sections 803, 900 and 901. Alternatively, those skilled in the art will appreciate that the PC board could be segmented into additional sections as a matter of design choice.

Figure 9A:
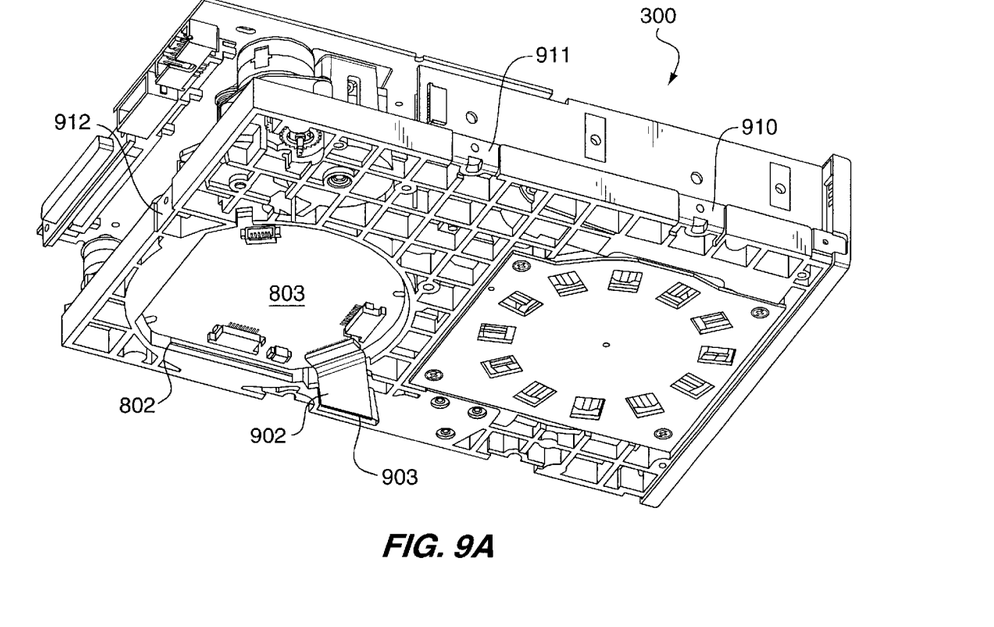
FIGS. 9A and 9B illustrate a PC board packaging configuration for a half-inch tape drive having a half height form factor according to the present invention.
Figure 9B:
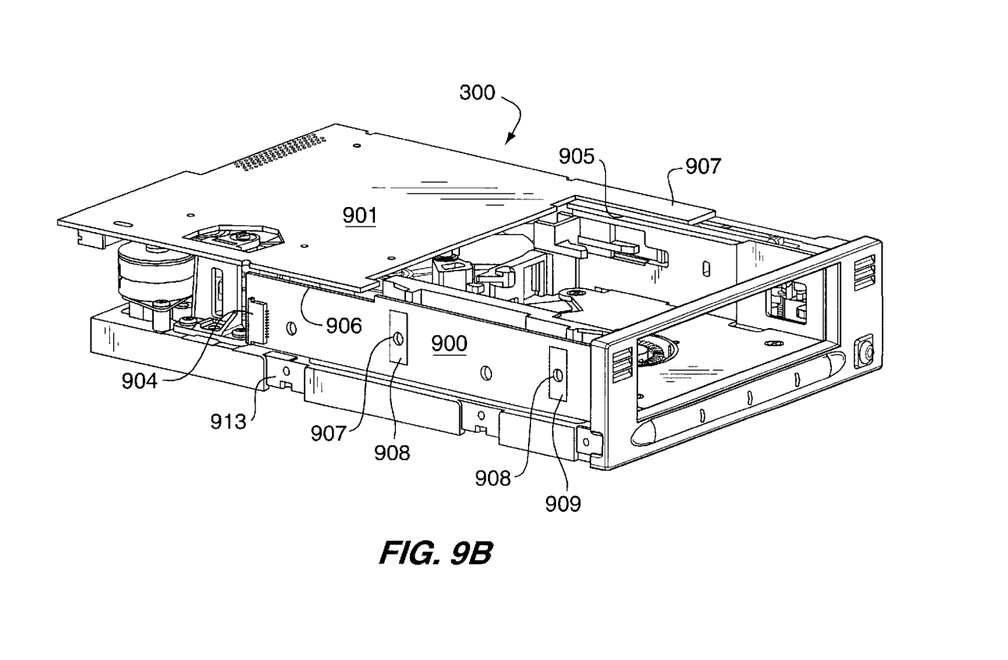

The logic board section 901 of the PC board is substantially "L" shaped and connects to the top of the tape drive 300 as illustrated by FIG. 9B. Advantageously, the logic board section 901 also provides a cover over the internal components of the tape drive 300, protecting them from dust and other debris. The read/write board section 900 is rectangular in shape and mounts along the side of the tape drive 300, as illustrated by FIG. 9B. The logic board section 901 and the read/write board section 900 are connected by a conventional hard connection at joint 906.

The servo board section 803 is substantially circular in shape and mounts in the recessed portion 802 of the tape deck 301. The servo board section 803 connects to the logic board section 900 by way of a flex cable 902 that passes through a slot 903 in the tape deck 301. Advantageously, flex cables are also used to connect other components of the tape drive 300, such as cable 904 that connects to the tape head 905. It should be noted that while the PC board sections 803, 900, and 901 generally include the circuitry depicted by their names, e.g. logic board section 901, the various circuitry components could be organized on the PC board sections 803, 900, and 901 in various other configurations as a matter of design choice to accommodate different half-inch tape drive formats.

Figure 10B:
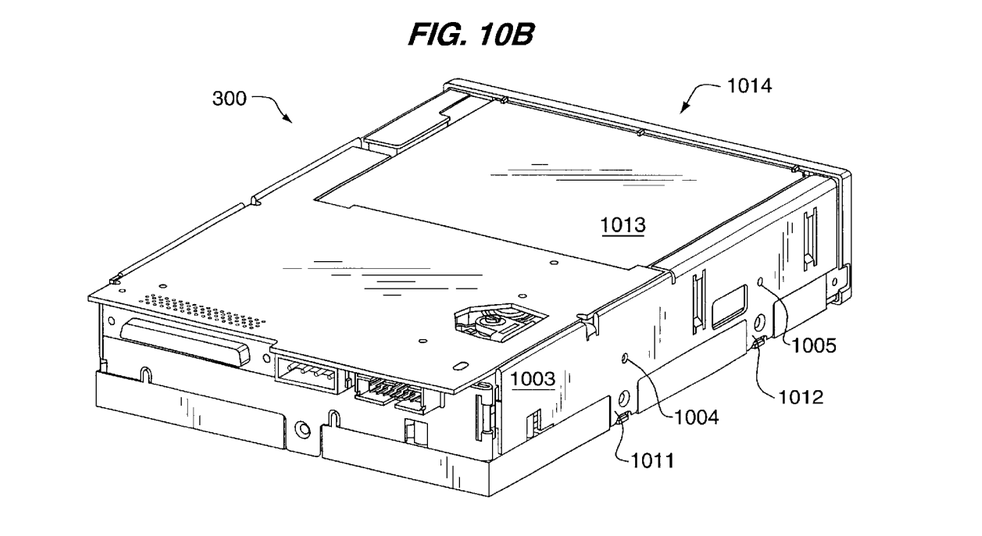

Housing FIGS. 10a and 10b

FIGS. 10a and 10b illustrate an example of a housing for the half-inch tape drive 300 having a half height form factor. The tape drive housing comprises three sections 1001, 1002, and 1003 that enclose the various tape drive components on three sides. Alternatively, the tape drive housing could be a single housing section or two integrally connected sections that are configured to detachably connect to a third section to enclose the tape drive components. The housing sections 1001–1003 could be sheet metal, plastic or any other suitable material as a matter of design choice. The tape drive housing also provides the mounting apertures 1004, 1005, 1006 and 1007 for installation of the tape drive 300 in a conventional computer drive bay. It should also be noted that bottom mounting apertures (not shown) are provided on the underside of the key ways e.g. 911 and 910. Advantageously, providing the mounting apertures e.g. 1004 in the tape drive housing, rather than in the tape drive deck 301 as done in the prior art, structurally isolates the tape drive 300 from variations in the mounting surface that can cause distortion. Referring back to FIG. 9B it can be seen that the read/write board section 900 also includes apertures 907 and 908 that align with apertures 1004 and 1005 to accommodate the tape drive mounting screws (not shown).

Referring to FIGS. 9A, 9B, 10A and 10B, the tape drive housing connects to the tape deck 301 through the use of keys 1008–1012 formed on the bottom portion of the housing sections 1001–1003 and mating key ways 910–914 formed in the respective sides of the tape deck 301. Advantageously, the housing sections 1001–1003 not only protect the tape drive components, but also provide the mounting connection for the logic board section 901 and the read/write board section 900. The read/write board section 900 is mounted behind and protected by the housing section 1003. The logic board section 901 is connected to the housing sections by screws located at various points around the top edge of the logic board section 901. In alternative embodiments, a cover 1013 can also be affixed over the tape cartridge bay 1014 to provide additional protection for tape drive 300 from dust and debris. Cover 1013 could be a sheet metal cover, plastic cover, or any other suitable material as a matter of design choice.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A tape drive configured to utilize half-inch tape media contained on a tape cartridge that is loadable into the tape drive, the tape drive comprising:
    a frame means for supporting a plurality of components, the frame means and the plurality of components being contained within a half-height form factor of a height dimension of no greater than 1.634 inches and the components comprising:
        means for reading data from the half inch tape media and writing data to the half inch tape media;
        means for loading and unloading the tape cartridge from the tape drive; and
        means for winding the half inch tape media as the data is read from the half inch tape media and written to the half inch tape media.

2. The tape drive of claim 1, wherein the means for winding comprises:
    a single reel equipped with a takeup leader for detachably interconnecting with a tape cartridge leader connected to the half inch tape media so that the tape media can be wound through a tape path between the tape cartridge and the single reel as data is read from and written to the half inch tape media, the single real comprising:
        a hub internally connected to the tape drive;
        a first segmented flange connected to a top of the hub; and
        a second segmented flange connected to a bottom of the hub in a parallel relationship with the first segmented flange, wherein the first segmented flange and the second segmented flange define a first tape containment section and a second tape containment section.

3. The tape drive of claim 2, wherein the first segmented flange and the second segmented flange are ultrasonically welded to the hub.

4. The tape drive of claim 2, wherein the single reel further comprises:
    a pair of rounded protrusions, wherein a first rounded protrusion is integrally formed on the first segmented flange and a second rounded protrusion is integrally formed on the second segmented flange.

5. The tape drive of claim 2, wherein the single reel further comprises:
    means for connecting the takeup leader to the single reel.

6. The tape drive of claim 2, wherein the single reel further comprises:
    a post integrally formed on a bottom of one of the first segmented flange and the second segmented flange that is configured to mate with a feature on the tape drive to prevent movement of the takeup reel when the tape cartridge is unloaded from and loaded into the tape drive.

7. The tape drive of claim 2, wherein the frame means comprises:
    a tape deck; and
    means within the tape deck for maintaining rigidity during operation of the tape drive.

8. The tape drive of claim 7, wherein the rigidity means comprises:
    a grid of reinforcing ribs.

9. The tape drive of claim 7, wherein the components further comprise:
    a plurality of guiding ribs integrally formed on a top of the tape deck and configured to vertically align the half inch tape media in the tape path during interruptions in the tape drive operation.

10. The tape drive of claim 1, wherein the loading means comprises:
    a load motor horizontally mounted in the tape drive;
    a worm gear connected to the load motor; and
    a gear train configured to mate with the worm gear.

11. The tape drive of claim 1, wherein the components further comprise
    a printed circuit board comprising a plurality of printed circuit board sections mounted in a corresponding plurality of locations in the tape drive.

12. The tape drive of claim 11 wherein the printed circuit board comprises a first printed circuit board section mounted in a first location in the tape drive, a second printed circuit board section mounted in a second location in the tape drive, and a third printed circuit board section mounted in a third location in the tape drive.

13. The tape drive of claim 12, wherein at least two of the first printed circuit board section, the second printed circuit board section and the third printed circuit board section are electrically connected to each other by flex cables.

14. The tape drive of claim 1 wherein the frame means comprises:
means for mounting the tape drive in a single drive bay in a computer.

15. A tape drive configured to utilize half-inch tape media contained on a tape cartridge that is loadable into the tape drive, the tape drive comprising:
a frame means for supporting a plurality of components, the frame means having a width dimension of no greater than 5.75 inches and the frame with its plurality of components mounted thereon being of a height dimension of no greater than 1.634 inches, the components comprising:
means for reading data from the half inch tape media and writing data to the half inch tape media;
means for loading and unloading the tape cartridge from the tape drive; and
means for winding the half inch tape media as the data is read from the half inch tape media and written to the half inch tape media.

16. The tape drive of claim 15, the means for winding comprises:
a single reel equipped with a takeup leader for detachably interconnecting with a tape cartridge leader connected to the half inch tape media so that the tape media can be wound through a tape path between the tape cartridge and the single reel as data is read from and written to the half inch tape media, the single reel being of height dimension no greater than 0.641 inches, the single reel comprising:
a hub internally connected to the tape drive;
a first segmented flange connected to a top of the hub; and
a second segmented flange connected to a bottom of the hub in a parallel relationship with the first segmented flange, wherein the first segmented flange and the second segmented flange define a first tape containment section and a second tape containment section.

17. The tape drive of claim 15, wherein the components further comprise
a printed circuit board comprising a plurality of printed circuit board sections mounted in a corresponding plurality of locations in the tape drive.

18. The tape drive of claim 17 wherein the printed circuit board comprises a first printed circuit board section mounted in a first location in the tape drive, a second printed circuit board section mounted in a second location in the tape drive, and a third printed circuit board section mounted in a third location in the tape drive.

19. The tape drive of claim 15, wherein the loading means comprises:
a load motor horizontally mounted in the tape drive;
a worm gear connected to the load motor; and
a gear train configured to mate with the worm gear.

* * * * *